April 14, 1964  D. N. JUDELSON  3,128,659
ROTARY KNIFE MACHINE FOR CUTTING MULTIPLE ROLLS
Filed March 20, 1961

INVENTOR.
DAVID N. JUDELSON
BY
Ameter + Levy
ATTORNEYS

United States Patent Office 3,128,659
Patented Apr. 14, 1964

3,128,659
ROTARY KNIFE MACHINE FOR CUTTING
MULTIPLE ROLLS
David N. Judelson, New York, N.Y., assignor to Oscar I.
Judelshon Inc., Jersey City, N.J., a corporation of
New York
Filed Mar. 20, 1961, Ser. No. 97,042
4 Claims. (Cl. 82—46)

The present invention relates generally to machines for cutting material, such as cloth, paper and the like, and in particular to an improved rotary knife type of cutting machine for simultaneously cutting plural rolls of materials each wound on a core into corresponding plural strips or tapes.

Rotary knife cutting machines of the type which enable the manual cutting of a roll of material into a number of strips or cuts of a prescribed width are generally known in the trade and find widespread application, particularly for cutting straight and biased cut fabrics into relatively narrow tapes. Typical of prior art machines is that described in U.S. Patent No. 2,457,310 of December 28, 1948, which includes a frame upon which is supported a stationary shaft for receiving a roll of material wound on a core, as of cardboard. The roll of material is rotated about the longitudinal axis of the stationary shaft by means of a chuck which engages one end of the roll and is driven from an appropriable variable speed drive. A high speed rotary knife is mounted on a knife carrier which is movable toward and away from the stationary supporting shaft. The carrier in turn is mounted on a movable carriage which has an indexing mechanism selectively engageable with the frame of the machine such that the carriage may be moved stepwise through a prescribed traversing stroke for moving the rotary knife into successive cutting positions along the length of the machine towards the chucked end of the roll of material. After each stepwise advance of the carriage, the operator actuates the knife carrier to move the rotary knife inwardly towards the stationary supporting shaft such that the rotary knife moves in a cutting plane substantially at right angles to the longitudinal axis of the roll and shears transversely through the roll of material and its supporting core.

The machine is capable of handling rolls having varying diameters; and for such varying diameters, a greater or lesser portion of the forward or cutting stroke of the rotary knife in its cutting cycle will be employed. Due to the large number of cuts which are made, and the often abrasive nature of the materials being cut, it is necessary to make provision for the sharpening of the peripheral cutting edge of the rotary knife. To this end, it is conventional to incorporate a sharpener in the cutting machine which may be engaged by the peripheral cutting edge during every cutting cycle to maintain the sharpness of such peripheral cutting edge, with the attendant grinding down of the rotary knife and reduction in its diameter. This likewise presents no difficulty in that it is merely necessary to advance the rotary knife somewhat more forwardly in its operative or cutting stroke to assure a complete penetration through the roll of material and its supporting core.

The use of such rotary knife cutting machines usually requires the full time attendance of a machine operator, even when using a substantially automatic rotary knife cutting machine of the type disclosed in copending application, Serial No. 722,301 filed March 18, 1958, and entitled "Improved Cutting Machine." Further, despite the high speed operation of presently available machines certain minimum times are required for cutting and the cutting capacity of such machines is limited. It will thus be appreciated that substantial economies could be realized if it were possible to simultaneously cut two rolls under conditions which would meet practical requirements, including the provision of good cuts, the capacity to handle rolls of varying diameters, and the attainment of through cutting despite the wearing of the knife incident to cutting and resharpening and the corresponding decrease in the knife diameter.

Broadly, it is an object of the present invention to provide an improved rotary knife cutting machine which realizes one or more of the aforesaid objectives. Specifically, it is within the contemplation of the present invention to provide a rotary knife cutting machine in which it is possible to simultaneously cut two rolls of material into strips or tapes.

In accordance with an illustrative embodiment demonstrating objects and features of the present invention there is provided a rotary knife cutting machine which comprises a frame, a stationary main shaft adapted to receive a first roll of material and mounted on the frame and a stationary auxiliary shaft adapted to receive a second roll of material and mounted on the frame. The longitudinal axes of the main and auxiliary shafts are disposed in a common plane. Respective first and second chucks are adapted to engage the first and second rolls to rotate the same about the main and auxiliary shafts. A knife carrier is provided on which is mounted a rotary knife which turns about a knife axis and is driven at a relatively high speed. The knife carrier is mounted on the frame for movement toward and away from the common plane such that the locus of the path of the knife axis bisects the angle subtended by successive lines through the knife axis and the respective longitudinal axes of the main and auxiliary shaft in successive positions of the rotary knife. Advantageously, provision may be made for mounting the auxiliary shaft on the frame for adjustment along a path defined by the line through the knife axis and a longitudinal axis for the auxiliary shaft when the rotary knife is in its limit position towards the respective main and auxiliary shafts.

The above brief description as well as further objects, features and advantages of the present invention will be more fully appreciated by reference to the following detailed description of a presently preferred, but nonetheless illustrative embodiment demonstrating features of the present invention, when taken in conjunction with the accompanying drawings, wherein.

Figure 1:
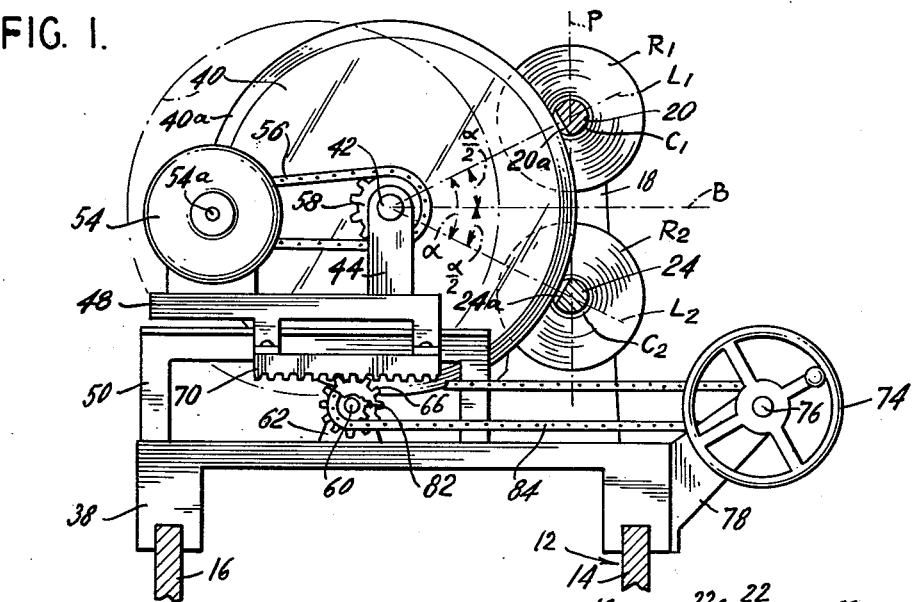
FIG. 1 is a side elevational view, with parts broken away and sectioned, of a rotary knife cutting machine embodying features of the present invention.

Referring now specifically to the drawings there is shown my improved rotary knife cutting machine, generally designated by the reference numeral 10, which includes a machine frame 12 having front and rear rails 14, 16 extending between opposite end walls or castings such, as the right end wall or casting 18.

Extending longitudinally of the machine frame 12 is a main roll supporting and turning arrangement which includes a stationary main shaft 20 and a rotatable chuck 22. The stationary main shaft 20 receives a roll of material $R_1$ which is wound on a core $C_1$ as of cardboard (see FIG. 1) and is adapted to be cut into plural strips cut or taped $S_1$, as illustrated at the left end of the shaft in FIG. 2. The stationary main shaft 20 is supported at its right end in an appropriate cradle or bearing in the upstanding end wall 18 and has its opposite end similarly cradled by an upstanding pivoted bracket (not shown) which may be swung to a position to enable the roll of material $R_1$ to be slipped onto the stationary main shaft 20 and the successive cuts $S_1$ removed therefrom. The chuck 22, which serves to turn the roll $R_1$ about the longitudinal main shaft axis, is of the type which includes a number of roll-penetrating pins 22a which may be engaged in the outer periphery of the roll $R_1$ for fixing the same against the adjacent end face of the chuck plate. For a detailed description of an improved chuck which may be employed in the present machine, reference may be made to U.S. Patent No. 2,938,733 entitled "Chuck With Roll End Penetrating and Gripping Pawls" of May 31, 1960.

Disposed below the main shaft 20 and in a common vertical plane therewith is an auxiliary roll supporting and turning arrangement which includes a stationary auxiliary shaft 24 and a rotatable chuck 26. The auxiliary shaft 24 receives a roll of material $R_2$ which is wound on a core $C_2$ and is adapted to be cut into plural strips or cuts $S_2$. The stationary auxiliary shaft 24 is supported at its right end in the upstanding end wall or casting 18 (as will be subsequently described in detail in conjunction with FIGS. 2 and 3) and is supported at its left end by a pivoted bracket (not shown) which may be swung to a clearance position to enable the roll $R_2$ to be inserted over the shaft and engage with the chuck 26 and the cuts or tapes $S_2$ removed from the shaft. The chuck 26 which serves to turn the roll $R_2$ includes a number of rolls penetrating pins 26a and likewise may be of the construction disclosed and described in detail in said U.S. Patent No. 2,938,733.

Figure 2:
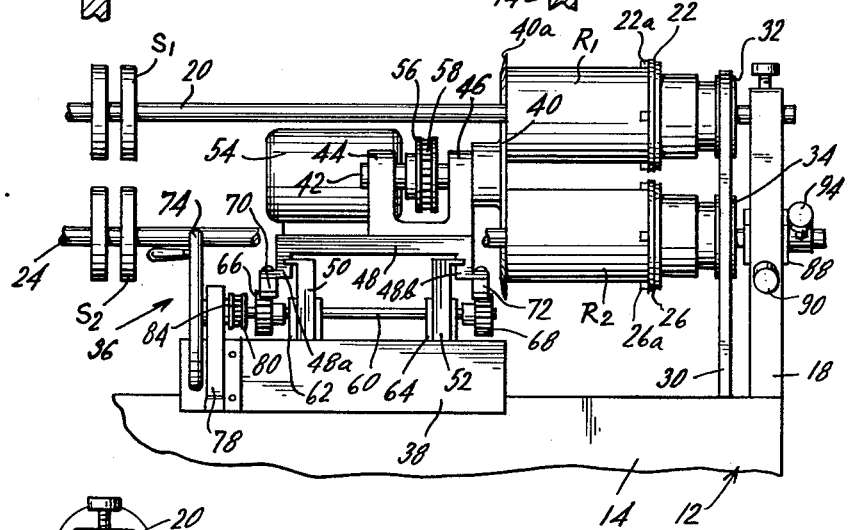
FIG. 2 is a fragmentary front elevational view taken from the right of FIG. 1; and, FIG. 3 is a fragmentary end elevational view taken from the right of FIG. 2.

As seen in FIG. 2, the chucks 22, 26 are rotated about the respective stationary main and auxiliary shafts 20, 24 at the prescribed roll-turning speed by an appropriate chuck motor (not shown), which has its output coupled via a drive belt 30 to respective driven pulleys 32, 34 operatively connected to the chucks 22, 26. Since the details of the drive to the chucks 22, 26 is generally understood and is disclosed in detail in U.S. Patent No. 2,938,-733 further description is dispensed with in the interest of brevity.

Mounted on the machine frame 12 is a knife assembly, generally designated by the reference numeral 36, which includes a knife carriage 38. The knife carriage 38 is mounted for movement longitudinally of the machine frame on the front and rear longitudinally extending rails 14, 16 and may be indexed through successive longitudinal traversing increments or strokes to bring the knife assembly 36 in successive cutting positions.

The knife assembly 36 further includes a high speed rotary knife 40 having a peripheral cutting edge 40a which is adapted to simultaneously penetrate through the multiple plies of the rolls $R_1$, $R_2$ and their respective cores $C_1$, $C_2$. The rotary knife 40 is mounted on a horizontal knife shaft 42 which extends parallel to the main and auxiliary shafts 20, 24. The knife shaft 42, as seen best in FIG. 2, is journaled in spaced bearings 44, 46, with the knife 40 being attached to the right end of the knife shaft 42 outwardly of the bearing 46 by an appropriate integral hub 40b. The bearings 44, 46 in turn are mounted on a knife carrier 48 which is movable transversely of the machine frame 12. The knife carrier 48 includes pairs of shoes 48a, 48b at the opposite ends thereof which engage spaced rails or tracks 50, 52 mounted on the carrier 38. The rails 50, 52 extend fore and aft of the carriage 38 such that the knife carrier 48 and its associated mechanisms may be moved fore and aft or transversely of the machine frame in the various longitudinally indexed positions of the knife carriage 38.

The knife shaft 42 is driven at the requisite high speed for rotating the knife 40 by a knife motor 54 which is mounted on the carrier 48 rearwardly of the bearings 44, 46, with the motor shaft 54a extending parallel to the knife shaft 42. The motor shaft 54a is coupled to the knife shaft 42 by an appropriate driving sprocket mounted on the motor shaft which is coupled by a chain 56 to a driven sprocket 58 fixed to the knife shaft 42 intermediate the bearings 44, 46.

The knife carrier 48 and the rotary knife 40 are moved through a cutting cycle from the retracted position illustrated by the dot-dash line in FIG. 1 to the forward limit position illustrated by the full lines through the provision of an appropriate manual or automatic knife cycling means. Typical of such appropriate means for moving the knife carrier 48 and the rotary knife 40 through the cutting cycle is the illustrated manually operated rack and pinion drive which is seen to include a pinion shaft 60 disposed below the carrier 48 and extending longitudinally of the machine frame parallel to the main and auxiliary shafts 20, 24. The pinion shaft 60 is journalled on the knife carrier 38 by appropriate bearings, 62, 64 and carries driven pinions 66, 68 which engage respective carrier-actuating racks 70, 72 mounted at the opposite ends of the knife carrier 48. The pinion shaft 60 is rotated to advance and retract the knife carrier 48 and the rotary knife 40 through the provision of a hand wheel mounted on a hand wheel shaft 76 journalled on a bracket 78 fixed to the forward side of the carriage 38. The hand wheel shaft 76 carries a driving sprocket 80 which is coupled to a driven sprocket 82 on the pinion shaft 60 at an appropriate chain 84.

As seen best in FIG. 1, the longitudinal axis of the main and auxiliary shafts 20, 24 are in a common vertical plane, shown by the broken line and designated by the letter P. The respective shafts 20, 24 are provided with flats 20a, 24a which are directed angularly of the plane P towards the adjacent peripheral cutting edge 40a of the high speed rotary knife 40 such that through penetration of the caroboard cores $C_1$, $C_2$ may be achieved without scoring or otherwise damaging the main and auxiliary shafts 20, 24 or for that matter the knife 40.

The knife carrier 48 mounts the knife 40 for movement towards and away from the common vertical plane P such that the locus of the path of the knife axis B bisects the angle subtended by successive line through the axis of the knife 40 and the respective longitudinal axes of the main and auxiliary shafts 20, 24 in successive positions of the rotary knife 40. With the knife 40 in its illustrated inner limit position, corresponding to the penetration of the peripheral cutting edge 40a through the cardboard cores $C_1$, $C_2$, it will be appreciated that the line $L_1$ which extends through the knife shaft 42 and the main shaft 20 and the line $L_2$ which extends through the knife shaft 42 and the auxiliary shaft 44 define an angle $\alpha$, with the locus of the path of the knife axis B bisecting the angle $\alpha$.

Figure 3:
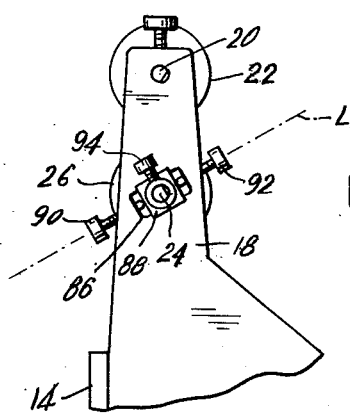

As seen in FIG. 3, provision is made for adjustably mounting the auxiliary shaft 24 for movement along an adjustment path corresponding to the line $L_2$. This adjustment facilitates the initial positioning of the auxiliary shaft 24 with respect to the main shaft 20 and to the knife shaft 42 to obtain the desired cutting action. Identical arrangements are employed at the opposite ends of the auxiliary shaft 24 and accordingly it will suffice to describe the adjusting mechanisms shown at the right end of the machine and illustrated in detail in FIG. 3. Specifically, a guideway 86 is provided in the end wall or casting 18 which provides a guide path at the same inclination as the line $L_2$ through the horizontal axis of the rotary knife shaft 42 and the auxiliary shaft 24 when the knife 40 is in the forward inner position illustrated in FIG. 1. A mounting block 88 is slidably mounted in the guideway 86 and may be secured in various adjusted positions therealong by the provision of the lower and upper adjusting screws 97, 92 which are disposed axially of the guideway 86 and are threaded through corresponding tapped holes in the opposite end walls communicating with the guideway 86 such that the respective leading ends thereof may be engaged with the mounting block 88 for securing the same in various suggested positions. The auxiliary shaft 24 in turn is secured to the mounting block 88 by an appropriate locking screw 94.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What I claim is:

1. In a rotary knife cutting machine, a frame, a stationary main shaft adapted to receive a first roll of material and mounted on said frame, a chuck adapted to engage said first roll for rotating the same about said main shaft, an auxiliary shaft adapted to receive a second roll of material and mounted on said frame, the longitudinal axes of said main and auxiliary shafts being disposed in a common plane, a second chuck adapted to engage said second roll for rotating the same about said auxiliary shaft, a knife carrier, a rotary knife, means operatively connected to and mounting said rotary knife on said knife carrier for rotary movement about a knife axis, a drive on said knife carrier for rotating said rotary knife about said knife axis, and means mounting said knife carrier on said frame for movement toward and away from said common plane such that the locus of the path of said knife axis bisects the angle subtended by successive lines through said knife axis and the respective longitudinal axes of said main and auxiliary shafts in successive positions of said rotary knife.

2. In a rotary knife cutting machine, a frame, a stationary main shaft adapted to receive a first roll of material and mounted on said frame, a chuck adapted to engage said first roll for rotating the same about said main shaft, an auxiliary shaft adapted to receive a second roll of material and mounted on said frame, the longitudinal axes of said main and auxiliary shafts being disposed in a common vertical plane, a second chuck adapted to engage said second roll for rotating the same about said auxiliary shaft, a knife carrier, a rotary knife, means operatively connected to and mounting said rotary knife on said knife carrier for rotary movement about a horizontal axis, a drive on said carrier for rotating said rotary knife about said horizontal axis, and means mounting said knife carrier on said frame for movement toward and away from said vertical plane such that the locus of the path of said horizontal axis bisects the angle subtended by successive lines through said horizontal axis and the respective longitudinal axes of said main and auxiliary shafts in successive positions of said rotary knife.

3. In a rotary knife cutting machine, a frame, a stationary main shaft adapted to receive a first roll of material and mounted on said frame, a chuck adapted to engage said first roll for rotating the same about main shaft, an auxiliary shaft adapted to receive a second roll of material and mounted on said frame, the longitudinal center lines of said main and auxiliary shafts being disposed in a common vertical plane, a second chuck adapted to engage said second roll for rotating the same about said auxiliary shaft, a knife carrier, a rotary knife having a peripheral cutting edge, means operatively connected to and mounting said rotary knife on said knife carrier for rotary movement about a horizontal axis, a drive on said knife carrier for rotating said rotary knife about said horizontal axis, means mounting said knife carrier on said frame for movement toward and away from said vertical plane such that the locus of the path of said horizontal axis bisects the angle subtended by successive lines through said horizontal axis and the respective longitudinal axes of said main and auxiliary shafts, said rotary knife being movable into a limit position wherein said peripheral cutting edge is adjacent said main and auxiliary shafts, and means for adjusting the stationary position of said auxiliary shaft relative to said frame including a guideway defining an adjustment path along a line through said horizontal axis of said rotary knife when in said limit position and the longitudinal axis of said auxiliary shaft, a mounting block operatively connected to said auxiliary shaft and slidably mounted in said guideway, and means for releasably securing said mounting block in various adjusted positions along said guideway.

4. In a rotary knife cutting machine, a frame, a stationary main shaft adapted to receive a first roll of material and mounted on said frame, a chuck adapted to engage said first roll for rotating the same about main shaft, an auxiliary shaft adapted to receive a second roll of material and mounted on said frame, the longitudinal center lines of said main and auxiliary shafts being disposed in a common vertical plane, a second chuck adapted to engage said second roll for rotating the same about said auxiliary shaft, a knife carrier, a rotary knife having a peripheral cutting edge, means operatively connected to and mounting said rotary knife on said knife carrier for rotary movement about a horizontal axis, a drive on said knife carrier for rotating said rotary knife about said horizontal axis, means mounting said knife carrier on said frame for movement toward and away from said vertical plane such that the locus of the path of said horizontal axis bisects the angle subtended by successive lines through said horizontal axis and the respective longitudinal axes of said main and auxiliary shafts, said rotary knife being movable into a limit position wherein said peripheral cutting edge is adjacent said main and auxiliary shafts, and means for adjusting the stationary position of said auxiliary shaft relative to said frame along a line through said horizontal axis of said rotary knife when in said limit position and the longitudinal axis of said auxiliary shaft.

References Cited in the file of this patent

UNITED STATES PATENTS

| | | |
|---|---|---|
| 1,080,797 | Witteman | Dec. 9, 1913 |
| 1,717,047 | Litvinas | June 11, 1929 |
| 1,952,209 | Judelshon | Mar. 27, 1934 |
| 2,729,879 | Sampson | Jan. 10, 1956 |